Figure 1:
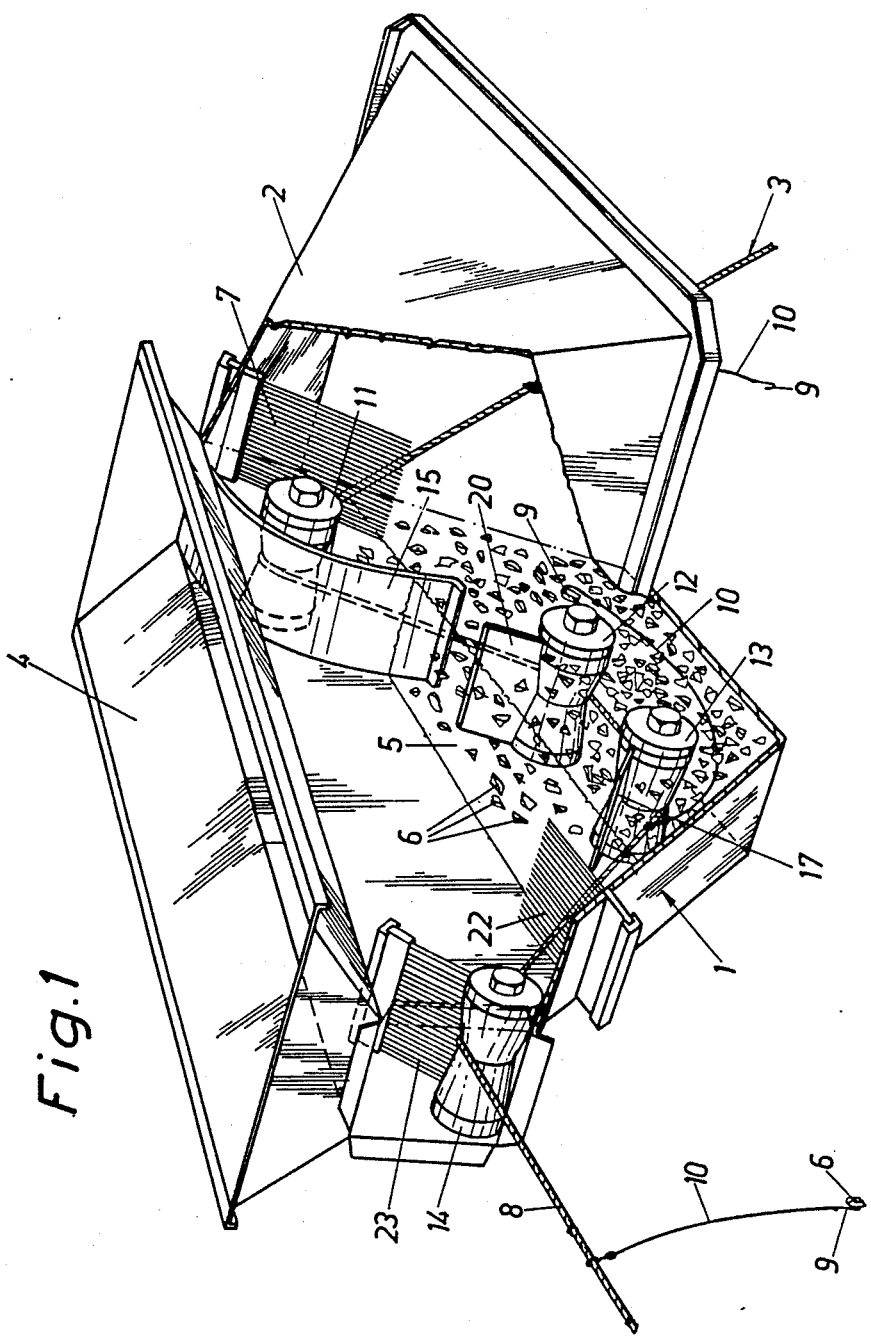

United States Patent [19]

Gustavsson

[11] Patent Number: 4,897,954
[45] Date of Patent: Feb. 6, 1990

[54] APPARATUS FOR BAITING LONG LINES

[75] Inventor: Bert U. Gustavsson, Nävragöl, Sweden

[73] Assignee: Profish International AB, Solna, Sweden

[21] Appl. No.: 124,098

[22] PCT Filed: Mar. 18, 1987

[86] PCT No.: PCT/SE87/00137
§ 371 Date: Sep. 16, 1988
§ 102(e) Date: Sep. 16, 1988

[87] PCT Pub. No.: WO87/05465
PCT Pub. Date: Sep. 24, 1987

[30] Foreign Application Priority Data

Mar. 19, 1986 [SE] Sweden .................................. 8601268

[51] Int. Cl.$^4$ ............................................. A01K 79/00
[52] U.S. Cl. ...................................... 43/27.4; 43/57.1
[58] Field of Search ................... 43/57.3, 57.2, 57.1, 43/54.1, 27.4, 4

[56] References Cited

U.S. PATENT DOCUMENTS

| | | | |
|---|---|---|---|
| 4,250,648 | 2/1981 | Jacobsen | 43/27.4 |
| 4,354,323 | 10/1982 | Huff | 43/57.3 |
| 4,644,677 | 2/1987 | Chureau | 43/27.4 |

Primary Examiner—Nicholas P. Godici
Assistant Examiner—Michael William Starkweather
Attorney, Agent, or Firm—Harness, Dickey & Pierce

[57] ABSTRACT

An Apparatus for baiting long lines comprising a container holding water mixed with bait. The container is provided at its bottom with guide rollers designed to conduct a long line introduced into the container at the top thereof downwards and through the mixture of water and bait. A first baffle is provided in the container and extends essentially in the direction of advancement of the long line. The baffle may be set in different angular positions relative to the interior end wall of the container to form a baiting zone through which the long line is made to pass. A second baffle behind the first baffle may be adjusted into different positions of inclination relative to the first baffle to guide the flow of water and bait downwards behind the first baffle.

3 Claims, 2 Drawing Sheets

APPARATUS FOR BAITING LONG LINES

The subject invention concerns an apparatus for baiting long lines comprising a main line and a number of hook leaders which are suspended from the main line at regular intervals and which support hooks at their outer free ends.

In professional long line fishing very long reef lines are used, comprising several thousands of hooks. Baiting all these hooks manually would be too complicated and time-consuming. For this reason an apparatus has been in use for some time which comprises a container holding the bait mixed with water. The container is equipped with guide rollers serving to guide a long line which is pulled through the container from the inlet opening at the top of the apparatus at one end thereof down through the bait to ensure that the hooks to be baited pass through the mass of bait and that each hook, upon its passage catches some bait, and to carry the baited line further through an opening formed at the opposite end of the container and direct it down into the sea.

An apparatus of this kind allows baiting of the hooks of the long line to be carried out a great deal quicker than would be possible by baiting the hooks manually. However, one has found that as soon as part of the bait inside the container has been carried away by the hooks and consequently the bait concentration in the water is reduced it becomes gradually more difficult for the hooks to "catch" the bait. As a result, a large number of hooks, entrained by the long line, may leave the container without having any bait impaled thereon.

Attempts have been made to use only bait inside the container, thus without mixing it in water, so as to ensure that the hooks always pass through bait as long as there is any left in the container. However, this solution has proved to be not entirely satisfactory, the reasons being that a compact mass of bait exerts a larger resistance force which the hooks have to overcome when passing through the bait, with the result that a piece of bait, although impaled by a hook during the passage of the latter through the mass of bait, easily is torn into pieces by the friction and comes off the hook. In addition, the reef line, passing through the mass of bait, gradually forms a track therein which is free of bait with impairing baiting results.

The purpose of the subject invention is to solve the problem of ensuring maximum baiting results with the aid of an automatized baiting apparatus. This has become possible in accordance with the teachings of the invention therein that in a container of the kind described initially through which the long line travels guided by rollers, a first baffle is provided which extends essentially in the direction of advancement of the reef line, said baffle being adjustable into various angular positions relative to the interior end wall of the container so as to define with said interior end wall a baiting zone of varyable width through which the reef line including its hook leaders and hooks is made to pass during the line advancement through the container. An apparatus of this kind ensures considerably improved baiting results.

In accordance with a further development of the invention a second baffle is provided behind the first baffle as seen in the direction of advancement of the line, said second baffle being adjustable into various positions of inclination to control the inflow of bait and water behind the first baffle. This arrangement improves even further the possibilities of inducing bait to be pierced by the hooks compared with prior-art technology, also when the greater part of the supply of bait in the container has been consumed.

Figure 2:
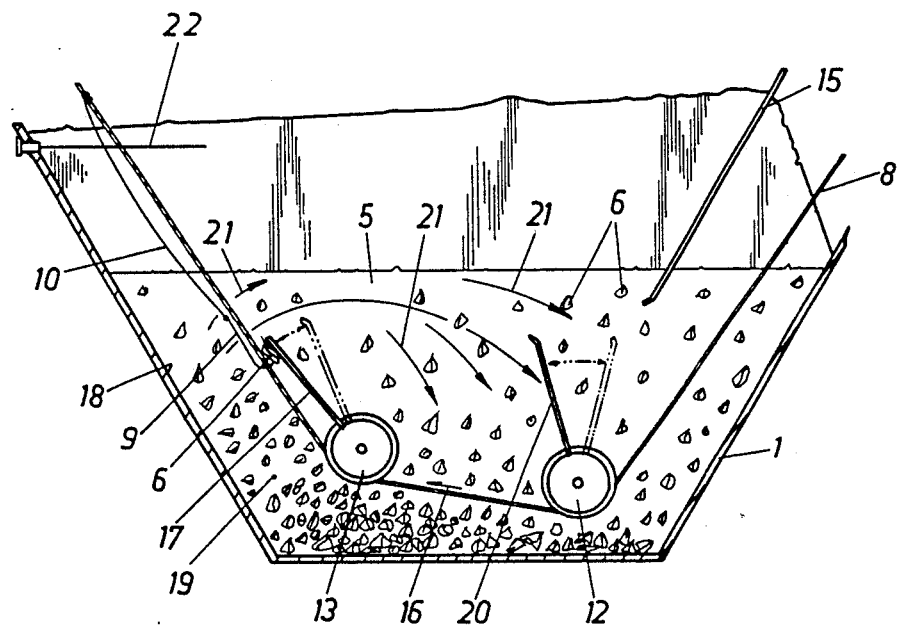

The invention will be described in closer detail in the following with reference to the accompanying drawings, wherein FIG. 1 is a perspective, partly broken view through the apparatus in accordance with the one embodiment thereof, and FIG. 2 is a vertical cross-sectional view through the container of FIG. 1.

The apparatus consists of a container 1 with a feed-in funnel 2 through which a long line 3 is pulled into the container, and with a supply funnel 4 for supplying water 5 and bait 6 into the container. In front of the feed-in opening of the container the funnel 2 is provided with a brush 7 extending transversely across the direction of advancement of the long line 3. The long line 3 consists of a reef line 8 and of hooks 9 supported at the free ends of hook leaders 10 suspended from the line at regular intervals. When the long line 3 is fed into the funnel 2 the brush 7 catches the individual hook leaders 10 and the hooks 9 attached thereto and dampen their movements.

In accordance with the shown embodiment the container 1 is provided with four guide rolles. One roller 11 is positioned adjacent the feed-in opening, a pair of rollers 12, 13 are positioned at the bottom of the container and one roller 14 is positioned at the top of the container adjacent the discharge opening. During the advancement of the long line 3 through the container 1 the reef line 8 is conducted above the guide roller 11, down below the guide rollers 12, 13 and then travels up and above the guide roller 14, as shown in the drawings, FIG. 1. A protective plate 15 which is positioned across the feed-in opening and which projects a distance down into the container, prevents each hook leader 10 when the associated hook 9 leaves the brush 7, from jerking into the feed-in funnel 4 while the reef line 8 is being carried around the guide roller 11.

The container 1 is partly filled with a mixture of water 5 and bait 6. In stagnant water the bait has a tendency to sink to the bottom. During the baiting operation the reef line 8 with its hook leaders 10 and hooks 9 attached thereto is, however, advanced through the container 1 at a speed of a couple of meters per second. This movement creates turbulence in the mixture of water 5 and bait 6. In FIG. 2 arrow 16 shows the direction of advancement of the reef line 8. At the bottom of the container 1 the mixture of water 5 and bait 6 flows in the same direction. At the top a back-flow occurs in the opposite direction. In accordance with the invention the roller 13 is provided with a baffle 17 extending essentially in the direction of advancement of the reef line 8. The baffle 17 is adjustable into various angular positions in relation to the inner end wall 18 of the container 1 so as to define a baiting zone 19 of varyable width. The reef line 8 including its hook leaders 10 and hooks 9 attached thereto pass through the baiting zone, which ensures that the hooks 9 which have failed to catch any bait 6 during their passage up to the baiting zone 19 will do so now.

In accordance with the invention the guide roller 12 is provided with an upwards directed baffle 20 which may be set in various positions of inclination relative to the baffle 17. The second baffle 20 which is positioned behind baffle 17 as seen in the direction of advancement of the reef line 8 controls the back-flow of water 5 and bait 6 as illustrated by arrows 21. The positions of adjustment of baffle 17 as well as those of baffle 20 are set in dependency of the kind of bait that is used, i.e. in dependency of the size and the rate of sinking of the bait 6, but also in dependency of the dimensions of the hooks that are used. Consequently, the baffle 20 ensures satisfactory back-flow of bait 6 down between the guide rollers 12 and 13, and the baffle 17 causes the bait 6 to agglomerate, which improves the possibilities of the hooks 9 to catch the bait 6. As illustrated in FIG. 2 the baffle 17 may attribute to the piercing of a piece of bait 6 on the hook 9 also because of the scraping movement of the hook along the side of the baffle, with the result that bait entrained by the hook, will be caught thereby more easily.

Above the baffle 17 there is provided a transversely directed brush 22 and above brush 22 a second brush 23. The reef line 8 is arranged to pass through both brushes. The passage of the hooks 9 through the two brushes 22, 23 ensures primarily that the bait 6 is pressed firmer onto the hook and secondly that loose bait is scraped off, bait which would otherwise have been entrained with the line and fallen into the sea without being put to use.

The apparatus in accordance with the invention makes it possible to obtain considerably improved long line baiting results, both because the risk that a hook 9 will not catch any bait 6 has been reduced to a minimum and also because contrary to what has hitherto been necessary it is no longer needed to have a considerable surplus of bait up to the end of the baiting operation, since it becomes possible to use most of the bait 6 inside the container 1 also with a minimum of residual bait at the end.

The invention is not limited to the embodiment as shown and described but a number of modifications are possible within the scope of the appended claims. For instance, baffles 17 and 20 need not be attached to the respective guide roller 13 or 12 but could be rotationally mounted in the side walls of the container 1.

I claim:

1. An apparatus for baiting long lines (3) comprising a reef line (8) and a number of hook leaders (10) depending therefrom at regular intervals, each supporting a hook (9) at its outer free end, said apparatus comprising a container (1) holding water (5) mixed with bait (6) and being equipped at its bottom with guide rollers (12, 13) serving to conduct a long line (3) introduced into the container (1) at the top thereof through said mixture of water (5) and bait (6), characterized therein that the container (1) is provided with a first baffle (17) which extends essentially in the direction of advancement of the reef line (8) and which is adjustable into various angular positions relative to the interior end wall (18) of the container so as to define together with said interior container wall a baiting zone (19) of varyable width through which the reef line (8) including its hook leaders (10) and hooks (9) are made to pass during the line advancement through the container (1).

2. An apparatus as claimed in claim 1, characterized therein that the first baffle (17) is pivotally mounted on the one (13) of the guide rollers of the container (1) from which the reef line (8) is deflected upwards from the bottom of the container (1).

3. An apparatus as claimed in claim 1, characterized therein that a second baffle (20) which is directed upwards, is provided in a position at a distance behind the first baffle (17) as seen in the direction of advancement of the reef line (8), said second baffle (20) being adjustable into various positions of inclination relative to the first baffle (17) in order to vary the flow of water (5) and bait (6) down behind the first baffle (17).

* * * * *